United States Patent Office 3,351,899
Patented Nov. 7, 1967

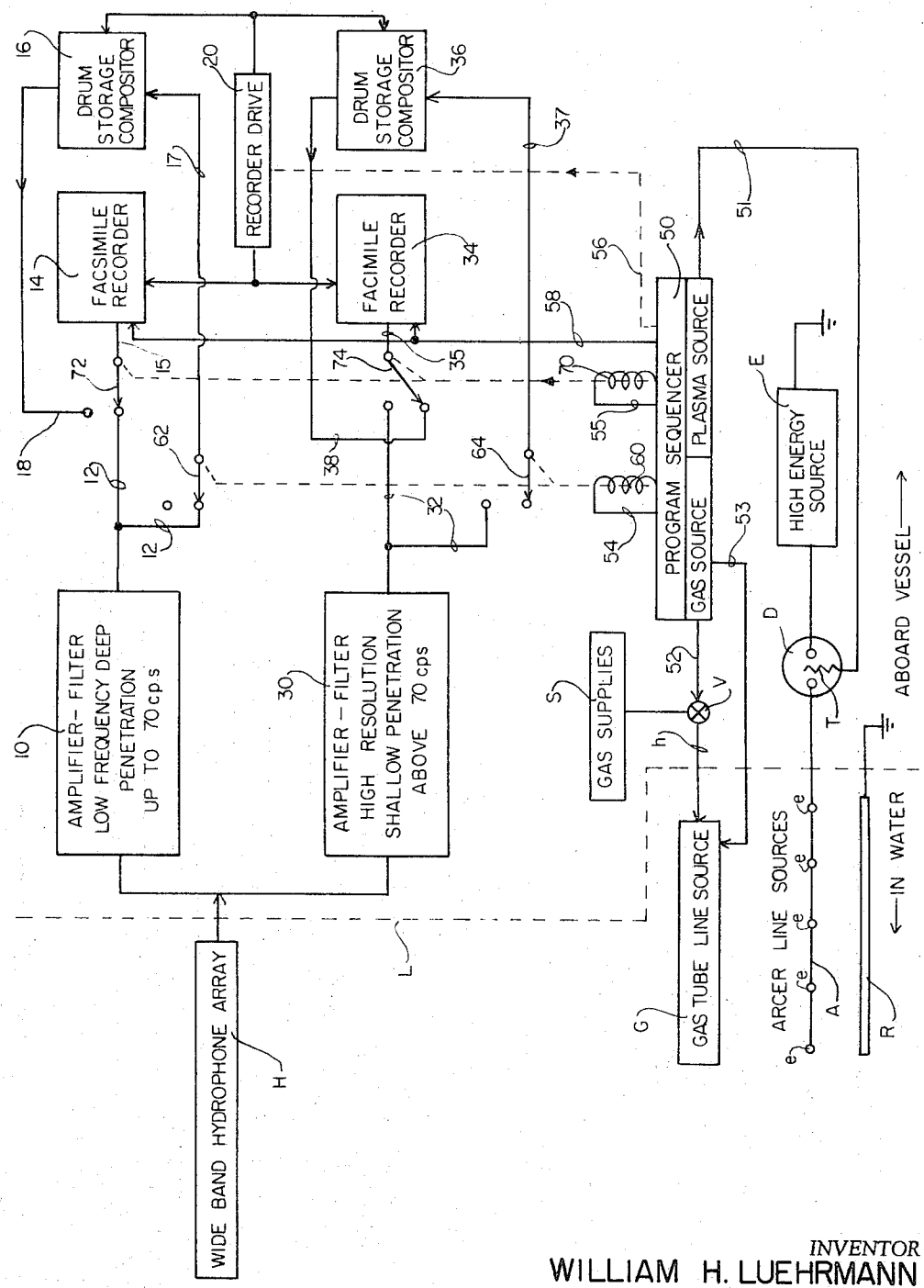

3,351,899
PROGRAMMED MULTIPLE SHOT SOURCE
SYSTEM AND METHOD
William H. Luehrmann and Neil A. Moore, Dallas, Tex.,
assignors to Teledyne Industries, Inc., Geotech Division, a corporation of California
Filed June 27, 1966, Ser. No. 560,782
8 Claims. (Cl. 340—7)

ABSTRACT OF THE DISCLOSURE

A seismic survey technique in which different types of shock sources are alternately initiated and their associated reflections separately recorded after each shock initiation and prior to the next initiation. The sources include one type which is rich in low frequencies to obtain deep penetration, and another type which is rich in higher frequencies to obtain better resolution. The reflections are recorded both on separate facsimile recorders and on separate temporary storage recorders. The system is sequenced in such a way that when the storage recorder associated with an active source is receiving signals, the storage recorder associated with the idle source is receiving nothing but is used to play back the last-received reflections and re-record them on the associated facsimile recorder to increase the visual horizontal density and thereby reduce the vertical exaggeration of the facsimile image. The storage recorders can also be used to composite plural successive shots by the same source to enhance significant events.

---

This invention relates to improvements in seismic survey systems and methods for obtaining, recording and processing reflection data to provide optimum profile signatures.

It is well known in the prior art that the spectrum of frequencies contained in a shock wave generated by a seismic source strongly affects both the depth of penetration of the shock wave into the strata and the degree of resolution of the resulting data as recorded through an array of geophones and/or hydrophones. The lower the frequency, the deeper the penetration, but the poorer the resolution. Conversely, higher frequencies provide improved resolution, but shallower penetration.

It is a principal object of this invention to provide a novel system and method for cyclically interlacing lower and higher frequency acoustic shocks, and recording in separate channels the resulting reflection signal data in an improved manner designed to optimize the information recovered and the relationship between profiles obtained by alternate shocks of different frequency spectra.

Another important object of this invention is to improve the aspect ratio of the resulting recorded data by decreasing the vertical exaggeration which is usually inherent in graphically recorded profiles, and especially those which are recorded by facsimile apparatus wherein the reflection data received as a result of each shock initiation is displayed on sensitized paper in a substantially vertical column, the human eye synthesizing the adjacent columnar dots or lines into a composite profile signature.

The present improved technique involves the recording of each shot point return in one column, repeated again in the adjacent column of the same graphical recorder during the interval when another graphical recorder in the other recording channel is operative to record the data being processed thereonto for the first time. This has the effect of doubling the horizontal density of the profile so that its horizontal length can be increased without loss of readability and for the purpose of decreasing its vertical exaggeration by a factor of 2:1.

The present invention is described with reference to an underwater survey system which uses two different amplifying and recording channels, one tuned to pass low frequency gas-tube discharge reflections, and the other tuned to pass higher frequency plasma-arc discharge reflections, and both of these channels including its own individual recording system. The recording system for each of the channels includes both a chart-type facsimile recorder, for instance of the general type employed in Huckabay Patent 2,981,357 or in Padberg Patent 2,866,-512, plus a multi-track magnetic drum recorder, the former providing a permanent pictorial record of the profile signature and the latter providing temporary storage easily reproducible as electrical output signals.

The two recording channels receive new information from hydrophone means, frequency filter the signals to separate them, and then record the information respectively in the channel corresponding with the gas or plasma source which initiated them. Where the sources are fired alternately, each recording channel would normally be inoperative during one-half of the seismic prospecting cycle, but the present system provides means whereby each channel records its new information both on the facsimile and the drum recorder during its primary operating time corresponding with the initiation of a frequency spectrum to whch it is tuned, but then during its secondary operating time while the other channel is performing in its primary mode, the recording system in the first channel reads the information back from its drum recorder into its facsimile recorder to provide a repeat recording of the previously received data. From a graphical point of view, this re-recording expedient doubles the visual horizontal density on the graph without doubling the rate at which the seismic shock waves must be initiated from the system.

Another important function of the drum storage recorder in each channel is that it is capable of functioning as a compositor for receiving and recording data taken during plural successive shots, and then simultaneously reading this data back through averaging means, or even through a correlating system, in order to enhance significant events while suppressing noise components. The compositor's output can then be graphically recorded on the facsimile recorder as a permanent record.

The successful operation of the system as described above requires the performance of one or more programmed sequences in cyclic timed relationship. It is therefore an object of the invention to include an automatic programmer-sequencer which controls the cycle of the various functions of the system. The sequencer controls the firing of the plasma arc source alternately with the firing of the gas-tube source including the flow of gas to the latter prior to its firing. Furthermore, the sequencer switches the amplifiers and recorders at appropriate intervals so that each channel first receives and records new information on both of its recorders and then subsequently, during operation of the other channel re-records the same information from the magnetic recorder into the graphical recorder. The programmer-sequencer also provides an adjustable repetition rate for the entire system, and it is therefore the master timer for the system. The recorders all have their drive rates controlled so that they move in synchronism, and this drive rate can also be automatically controlled by the same sequencer.

The present alternating system is an improvement over a system of the type in which the lower and higher frequency sources discharge simultaneously because of the fact that in the improved system the signature events attributable to the low and high frequency sources, being sequential, do not interfere with each other and can be individually recorded and compared in order to extract maximum information from the recorded data. One does not obscure or mask the other.

Other objects and advantages of the present invention will become apparent during the following discussion of the drawing, wherein:

The drawing illustrates in block diagram form separate alternating gas discharge and plasma arc discharge seismic sources in which the alternation between the two sources is cyclically established, according to the present invention.

Referring now to the drawing, a vertical line L divides the diagram into two portions, the left portion indicating the shock sources, and the hydrophone array which operate under water in the present illustrative embodiment, for instance towed by a vessel; and the components shown to the right of the line L comprising the electronics contained within the towing vessel.

Since the structural details of the underwater equipment form no part of the present invention, the diagram shows only a broad disclosure of a hydrophone streamer H, an elastomeric gas-tube discharge source G for instance as shown in Roever Patent 3,176,787, and a plasma arcer source A having one or more discharge electrodes e, the arcer source including perhaps a return plane of reference R.

The purpose of the invention is to alternately fire a gas source G and an arcer source A, and to receive resulting reflections at one or more suitable hydrophone means H, which feed into tuned filters and amplifiers and eventually into suitable recorders.

The gas-tube source includes a gas supply S located within the towing vessel and connected by suitable gas hoses h to the source G, the flow of gas being controlled for instance by solenoid valve means V. The arcer source A is connected by ionization discharge switching means D to a source of high voltage energy E, which may include suitable storage capacitors and means for charging them. The discharge tube D has a trigger element T which, when triggered, causes ionization across the tube D to deliver a large charge of electrical energy, for example in the vicinity of 25,000 Joules, to the individual source electrode tips e. The structure and operation of all of the units described thus far is known per se in the prior art, and therefore requires no specific elaboration.

The novel operation of the present system requires a combination of the aforementioned sources and hydrophone means together with suitable electronic units contained within the towing vessel. Since the purpose of the source G is to initiate relatively low frequency shock waves, for instance at or below 70 cycles per second, and since the purpose of the arcer source A is to initiate relatively higher frequency shock waves, for instance above 70 c.p.s., and more probably in the neighborhood of 200 c.p.s., it is desirable to use separate tuned-filter amplifiers such as the amplifier 10 for low frequency amplification and amplifier 30 for higher frequency amplification. These amplifiers can be driven by reflection signals from either the same or from separate transducer arrays H. The output of the amplifier 10 appears on wire 12 and the output on amplifier 30 appears on wire 32, and suitable switching serves to control coupling of the amplifier outputs to the subsequent recorders.

One amplifying channel on the diagram includes the amplifier-filter 10, the facsimile recorder 14 and the drum storage recorder and compositor 16. The other channel includes the amplifier-filter 30, the facsimile recorder 34 and the drum recorder and compositor 36. The drive of all four recorders can be advantageously controlled and synchronized by drive means 20 which tends to keep the respective recorders in step so that reflections relating to the same seismic events will appear at identifiable corresponding points on the several graphical recording axes. The programmer-sequencer 50 establishes the cyclic repetition rate for all of the units on the diagram, keeps them suitably synchronized, and establishes the programmed sequence of their operation. All three of these functions are easily provided by a simple motor-driven system of cam switches (not shown) although other sequencing devices such as ring counters, etc., fall within the purview of the invention.

Among the various outputs of the sequencer 50 are the electrical signals for operating the discharge sources. The output along the wire 51 connects with the trigger T of the discharge tube D to fire the arcer line sources, which in the present illustration fire simultaneously at all of the electrode tips e. The output on wire 51 alternates with two closely sequenced outputs on the wires 52 and 53 which operate the gas-tube source. An output first appears on line 52 to open the solenoid valve V to introduce a new gas mixture into the tube G through the hoses h. After the mixture of gases has been introduced, an electrical signal on wire 53 fires the source.

Since the plasma source is fired alternately with the gas source, the switching of the amplifiers and recorders must be accomplished in the proper sequence. This switching is accomplished by alternate outputs along the wires 54 and 55 to selectively energize the windings of relays 60 and 70. The relay 60 includes contact switches 62 and 64 controlling the flow of output from amplifiers comprising the two separate channels into the inputs 17 and 37 of the drum storage compositors 16 and 36. The relay 70 has contacts 72 and 74 which respectively control the inputs to the facsimile recorders 14 and 34, and select whether these inputs come from the amplifier filters or from the drum storage compositors. The inputs to the facsimile recorders are labeled 15 and 35, and since these are paper chart recorders, they have no output signals. On the other hand, the magnetic drum recorders 16 and 36 have outputs along wires 18 and 38 from which information can be repeated into the corresponding facsimile recorders from the drum storage recorders.

There are various cyclic sequences of operation which can be easily provided by having several different banks of cam switches on the rotating shaft (not shown) of the program sequencer. The commonest of these cyclic sequences involves the alternate operation of the two different sources A and G to provide reflection signals in two different amplifier-filter and recorder channels. For instance, a first sequence could provide an output on wire 52 to fill the gas-tube source G, followed by an output on wire 53 to discharge it. The switches 62, 64, 72 and 74 are illustrated in the positions which they occupy when the relays 60 and 70 are unenergized, and in this position the output of the higher frequency amplifier-filter 30 goes nowhere, but the output of the low amplifier-filter 10 is connected to both the inputs 15 and 17 via the switches 62 and 72. The relays are allowed to remain in this position for a sufficient length of time for the hydrophone H to receive a complete family of echoes, pass them through the amplifier 10, and record them on the facsimile recorders 14 and 16. The drive of the recorders is synchronized with the initiation of the seismic sources via the line 56, which may be an electrical means or a mechanical mechanism linking the recorder drive 20 and the program sequencer. In the practical system in use presently, the drive of the recorder operates the program sequencer mechanism so that all of the recorder and sequencer units are in agreement as to initiation time-zero.

When the time has passed for receiving echoes during the gas-tube cycle, the sequencer then commences the next sequence by firing the alternate source, which in this case will be the plasma arcer A. During this second sequence of operation the sequencer will reverse the switch positions shown on the diagram by energizing relays 60 and 70 to move the contact 62, 64, 72 and 74 to their alternate positions. In these positions, the amplifier 30 is connected to drive both recorders 34 and 36, and the amplifier 10 is disconnected. In addition, the output wire 18 of the magnetic drum storage recorder 16 is connected via switch 72 to the input of the facsimile recorder 15.

When time-zero arrives, the sequencer delivers a signal along the wire 51 to trigger the discharge tube D to fire the source A, the reflections being picked up by the hydrophone H and being recorded in a column on the facsimile recorder 34 and on a track of the drum storage recorder 36.

However, in the top channel of the illustrative diagram, the drum storage recorder 16 repeats its stored signal along the wire 18 and into the facsimile recorder 14, and this signal is recorded in the next vertical column of the recorder 14. It represents the seismic events recorded during the preceding alternate sequence of the system as a result of the shock-wave previously initiated by the gas-tube G. Thus, each facsimile recorder records reflections during both alternate sequences of the overall system, i.e., recording new reflection information when its own channel is selected for primary operation by the sequencer, and recording a repeat thereof during its secondary operation when the other channel is receiving new information.

The present apparatus can perform a different sequence of events by merely changing the selection and/or adjustment of cam switches, one such modified cycle including the repeated firing of one of the alternative sources A or G and the sequential recording of each signature of the hydrophone output by the drum recorder corresponding with the selected source. Thus, one source may initiate, for instance, five shock waves in spaced succession and record echos on the corresponding drum storage recorder for each of the five initiations. These five reflections are then simultaneously played back to average them or even to correlate them, in order to provide a single composite signature which is in turn permanently recorded on the chart recorder. The performance of such a sequence requires the firing of the same source a number of times in spaced succession while controlling the relays 60 and 70 in such a way as to close the switch 62 or 64 in the appropriate channel to apply the signals to the selected drum storage compositor. An output along the wire 58 from the sequencer to both facsimile recorders disables the latter while the series of five signals in the above example are being successively recorded on the selected drum storage compositor, and until a composite output therefrom is to be recorded.

The present invention is not to be limited to the exact form shown in the drawing for obviously changes can be made therein within the scope of the following claims.

We claim:
1. A seismic survey system for obtaining and recording data representing formations at different depths, comprising:
 (a) geophone means;
 (b) plural amplifier channels connected to said geophone means and including tuned filter means adjusted respectively to pass a band of lower frequencies through one channel and a band of higher frequencies through a different channel;
 (c) a first seismic source operative when actuated to generate seismic disturbances at frequencies within said lower pass band;
 (d) a second seismic source operative when actuated to generate seismic disturbances at frequencies within said higher pass band;
 (e) seismic-reflection recorder means connected with said channels to record the frequencies passing therethrough; and
 (f) sequencer means operative to establish a continuous cycle of operation by the time-interlaced actuation of the first and second seismic sources according to a programmed sequence, and including means for actuation of said recorder means to separately record reflection signals corresponding with the particular frequency components within the pass bands of said plural channels.

2. In a survey system as set forth in claim 1, said recorder means comprising in each channel a graphical recorder of the type recording reflection signals from each source-initiation in substantially vertical columns in combination with a temporary storage recorder, and each channel performing a primary function when the source corresponding with its frequency band is actuated and a secondary function when the source corresponding with the other channel is actuated; switching means in each channel connected with the recorders and with the amplifier and filter means and operatively coupled with the sequencer means to be controlled thereby to selectively connect both recorders to record reflection signals from the amplifier and filter means when the channel is performing its primary function, and to connect the storage recorder to repeat the last-recorded signals to the graphical recorder to be recorded in the next adjacent column when the channel is performing its secondary function.

3. In a seismic survey system as set forth in claim 2, means for synchronizing the cyclic sequence of the temporary storage recorders and of the sequencer, and for advancing the graphical recorders in step with the cycle of the latter.

4. In a survey system as set forth in claim 1, said recorder means comprising in each channel a graphical recorder in combination with a multi-track magnetic recorder having sequential inputs and having means for compositing plural recorded signals to provide an enhanced output, said sequencer means including means for actuating each source plural consecutive times before alternating to actuate the other source, and the sequencer including means to disable the advance of the graphical recorders while the reflections from the plural similar-source actuations are being recorded by a multi-track recorder, and the sequencer means including means for advancing a graphical recorder and the associated magnetic recorder while recording a composite output from the latter onto the former.

5. In a system as set forth in claim 1 for profiling water-covered areas, said first seismic source including a submerged gas-tube line source, an explosive gas supply means; valve means connected between the gas tube and the supply means; and ignition means in the gas tube, the valve means and the ignition means being coupled to the sequencer for control thereby.

6. In a system as set forth in claim 5, said second source comprising a submerged electric arc discharge means; a high-energy electrical source; and switch means for coupling the latter to the former, the switch means being coupled to the sequencer for control thereby.

7. The method of surveying underwater formations from a vessel including the steps of towing hydrophone means; initiating in the water first seismic shock waves containing lower frequency-range components; initiating in the water second shock waves containing relatively higher frequency-range components; maintaining a continuous periodic cycle including alternately initiating said first and second waves in a programmed time-interlaced sequence leaving time between initiations for reflection signals to be received by the hydrophone means; separating and separately recording said reflection signals resulting from the respective first and second waves to form graphical representations having one coordinate axis representing displacement of the vessel across the formations being surveyed, the latter step including the steps of both graphically recording and magnetically recording each reflection signal resulting from a shock-wave initiation of one frequency range, and then re-recording said signal from the magnetic recording onto the graphical recording during initiation and recording of the other shock-wave frequency range so that neither graphical recording has blank areas during off-time intervals while the other graphical recording is receiving new reflection signals.

8. The method of surveying underwater formations from a vessel including the steps of towing hydrophone means; initiating in the water first seismic shock waves containing lower frequency-range components; initiating in the water second shock waves containing relatively higher frequency-range components; maintaining a continuous periodic cycle including initiating said first and second waves at different times in a programmed time-interlaced sequence; separating a separately recording reflections resulting from the respective first and second waves to form graphical representations having one coordinate axis representing displacement of the vessel across the formations being surveyed, said first and second shock waves being respectively initiated in programmed groups of plural similar waves before the cycle alternates to initiate groups of the other waves; and said recording including multi-track recording the sequence of reflection signals in each group, compositing the recorded group of similar signals, and then graphically recording the composited signals before completing the initiation of a group of waves of the other type.

References Cited
UNITED STATES PATENTS

| | | | |
|---|---|---|---|
| 2,994,397 | 8/1961 | Huckabay | 181—.5 |
| 3,066,754 | 12/1962 | Johnson | 181—.5 |
| 3,208,548 | 9/1965 | Levin et al. | 181—.5 |
| 3,251,027 | 5/1966 | Huckabay et al. | 340—7 X |

BENJAMIN A. BORCHELT, *Primary Examiner.*

P. A. SHANLEY, *Assistant Examiner.*